Figure 1:
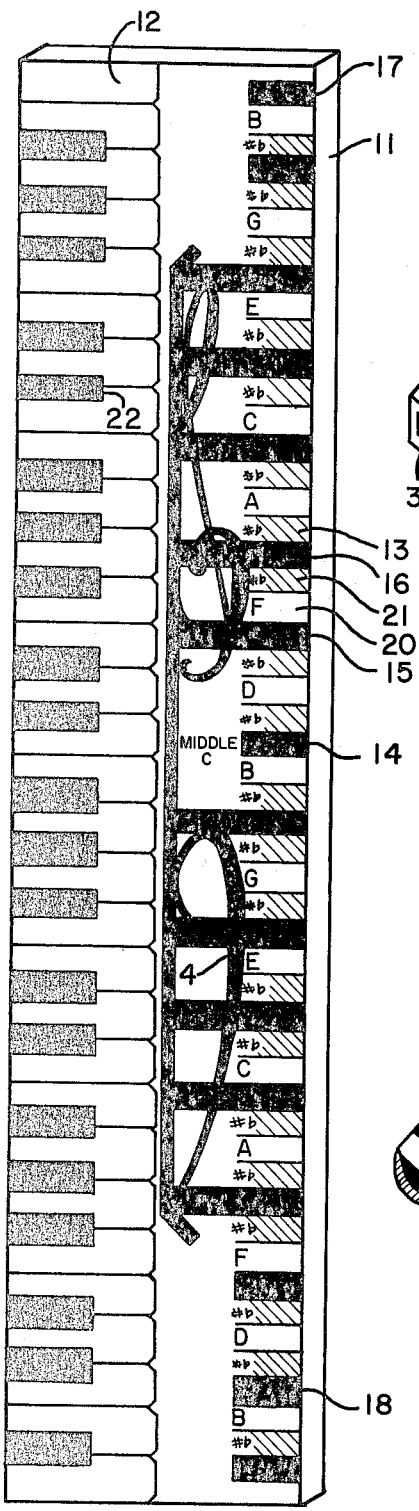

United States Patent
Puopolo

[15] 3,678,796
[45] July 25, 1972

[54] MUSIC SLIDE RULE

[72] Inventor: Vito Puopolo, 23 West Street, Norwood, Mass. 02062

[22] Filed: Oct. 12, 1970

[21] Appl. No.: 79,897

[52] U.S. Cl. ..........................................84/471, 84/477 R
[51] Int. Cl. ...................................................G09b 15/02
[58] Field of Search ..................84/470, 485, 481–483, 84/471–473, 475, 477–480

[56] References Cited

UNITED STATES PATENTS

| | | |
|---|---|---|
| 1,295,025 | 2/1919 | Gray..........................................84/473 |
| 2,564,616 | 8/1951 | Telasco....................................84/473 |
| 1,488,823 | 4/1924 | Masurovsky..........................235/70 A |

*Primary Examiner*—Richard B. Wilkinson
*Assistant Examiner*—John F. Gonzales
*Attorney*—Richard F. Benway

[57] ABSTRACT

A device consisting of a rule and transparent slides with the rule inscribed with the great staff and keys of a piano, while the slides may have the various notes of a major scale, triad, etc., inscribed thereon such that the notes simultaneously appear on the great staff and keyboard.

1 Claim, 7 Drawing Figures

INVENTOR.
VITO PUOPOLO
BY Richard F Benussy
ATTORNEY

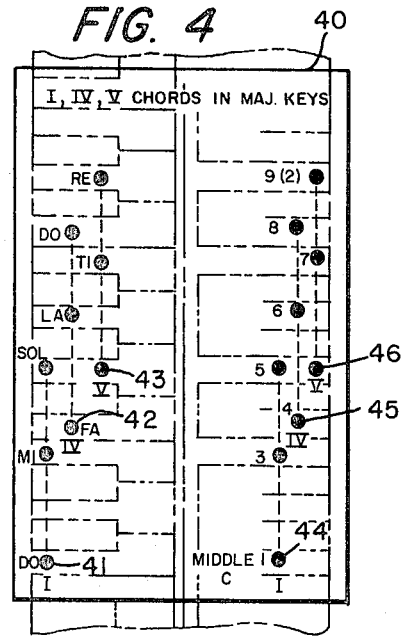
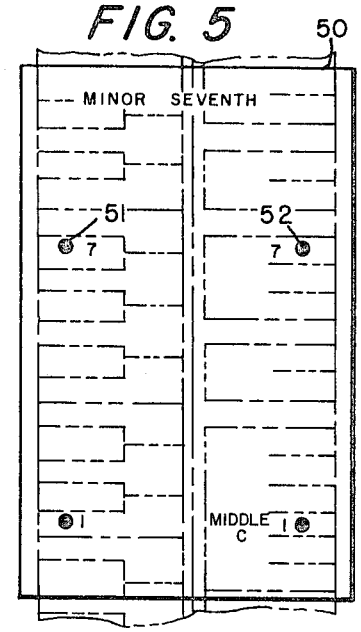
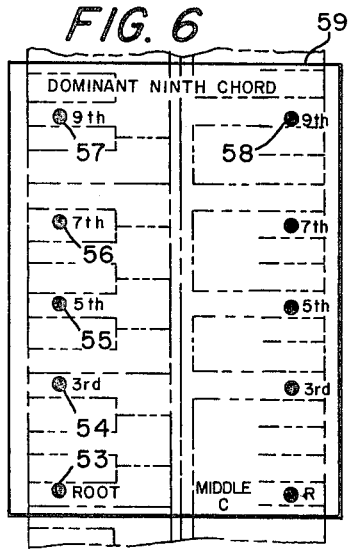
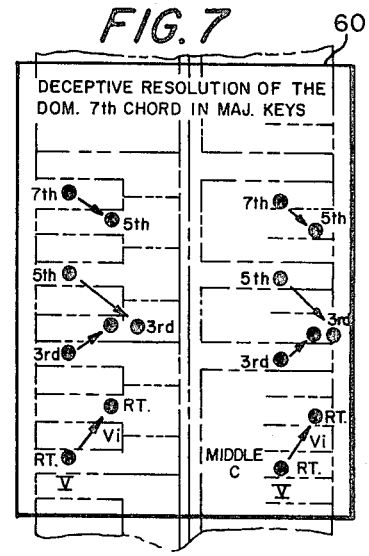
INVENTOR.
VITO PUOPOLO
ATTORNEY

MUSIC SLIDE RULE

Music is often referred to as the universal language. Music as a language, unfortunately, has at least three tongues. The first is the pattern of sounds we hear. The second is the great staff, with its notes and various notations inscribed thereon. The third tongue, if you will, is the musical instrument which requires the depression of strings, or, in the instant case, the striking of certain keys with specified finger positions on a piano keyboard. A student of music, in his first introduction to the subject, is bewildered as he tries to learn the three simultaneously. It is next to impossible to have all but the gifted students readily comprehend the sounds that the instrument produces, the various fingered keys required to produce these sounds and the musical notation which prescribes the fingered keys and consequent sounds that are to be produced.

The present invention provides the means whereby the last two tongues are immediately correlated as one, on the musical slide rule. Accordingly, the student can master instrument manipulation or fingered keys and musical notation in one image. He can therefore translate required basic chords into sounds, without error. Moreover, he can translate a given chord to any key, and readily see the correlations between flatted and regular notes. The rule is so constructed that notes which are flatted in any scale are readily envisioned by students.

The rule is so disposed that more than one slide can be placed upon it, and correlations between various triads and scales can be visualized while under discussion or study. This enables one to study, in fine, the various elements of music and expand on the similarities and differences between the various scales, chords, triads, and so forth.

Another significant advantage of the present invention is a component part of a larger educational program. An instructor, utilizing a textbook and program of learning together with this rule and the various pre-programmed slides can establish a regime of learning which the student can readily reinforce by independent practice apart from the classroom. As the student progresses with more complicated music and involved patterns, he can utilize the present invention as a reference, much as one would a dictionary, in order to refresh his memory and understanding of the fundamentals each slide portrays. He can select a given slide, which illustrates a segment of music such as a triad, and set about to analyze an error that he may be making or explore a piece of music that can be modified for various orchestrations, thereby preserving a preconceived theme.

Therefore, an object of the present invention is to provide a device for learning the correlation in music between sounds, notation, and fingered keys on a musical instrument.

AnOther object of the present invention is to provide an educational tool in the study of music.

Another object of the present invention is to provide a musical device for the correlation of various musical elements such as scales, chords, and so forth.

Another object of the present invention is to provide a reference such that various musical elements in a piece or score of music can be analyzed for harmony, dissonance, and so forth.

Figure 2:
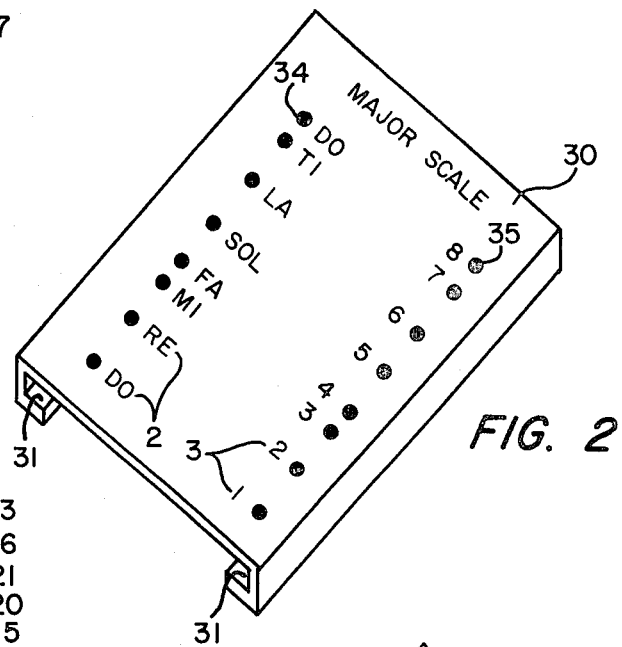
Figure 3:
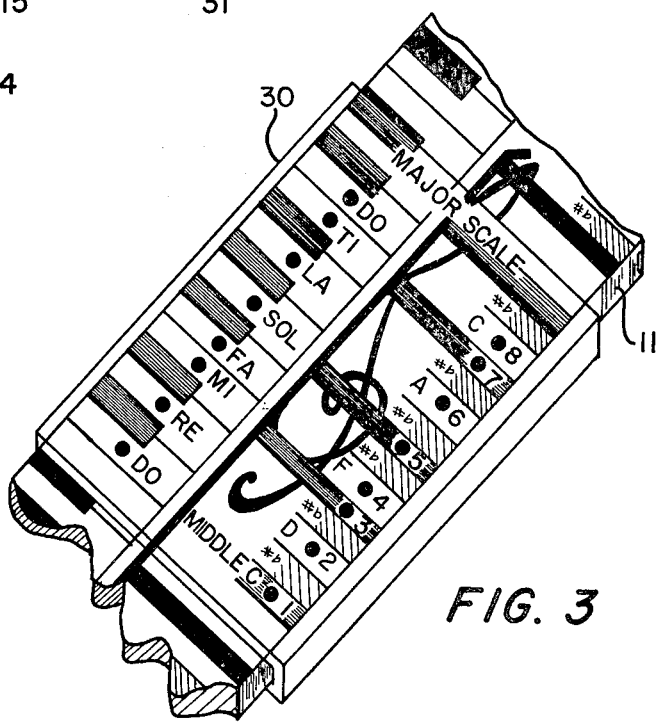

Other objects and features of the present invention will be better understood from the following illustrations, when read in connection with the attached drawings, of which:

FIG. 1 is a view of the rule.
FIG. 2 is a view of a slide.
FIG. 3 is a slide on a segment of the rule.
FIG. 4 is a slide of the various chords.
FIG. 5 is a slide of other chords.
FIG. 6 is a slide of the dominant ninth.
FIG. 7 is a slide showing resolutiOn of the 5-7 chord in major keys.

Referring to FIG. 1, we see a basic element of the present invention. It is a rule that has a piano keyboard inscribed along edge 12 and along remaining edge 13 the great staff. Line 14 represents middle C. Lines 15 and 16 and so forth, represent the various scale positions in musical script, such as E and G, and are so marked. We then see the great staff composed of lines and spaces along with several extensions of great staff 17 above the staff's normal range and 18 one octave below middle C. We also note the spaces between two lines, 15 and 16, with their letter names E and G are further subdivided into two parts. One is clearly marked F 20 with the shaded portion marked 21. This is G-flat, or F-sharp and is not noted on normal script, being peculiar to the present invention. However, it will be nOted that the piano flat or sharp 22 also corresponds to this shaded area. Therefore, the great staff has been somewhat modified on this rule in order to facilitate an essential correlation between the piano keyboard 12 and the great staff itself.

The above modification was found necessary and was discovered to be a very useful educational expedient. By modifying the great staff slightly, nothing is detracted from normal symbolic requisites. Yet on the other hand, the correlation necessary to understand the musical notations on the great staff and the finger keys on the piano keyboard are immediately apparent.

Referring now to FIG. 2, we see a transparent slide 30, which has an under-section 31 which causes the slide to be able to slide over rule 11. Inscribed on this transparent slide is the major scale. On one side of slide, the scale 34 has its positions designated as Do, Re, Mi, and so forth. On the right hand portion, the scale designations have their numerical symbols indicated 1, 2, 3, and so forth.

Referring now to FIG. 3, we see the major scale as it would appear when over rule 11. The lefthand portion of the slide lines up on the piano keyboard and we can see the necessary fingered keys or the keyboard which must be struck for a given note as Do, Re, Mi, Fa, Sol, La, Ti, Do and so forth. The right hand portion of the slide is now lined up over the great staff, and you will note that the numerically designated note positions on the great staff are indicated on middle C, D, F, A, and so forth, on up the scale in direct correspondence with the Do, Re, Mi of the left hand portion of the slide. A student having this rule and slide available to him now can learn a great deal about musical notation and the various fingered keys on the piano as he learns more about the basic element of music, the major scale. He merely has to slide the slide up and down and he can raise or lower the music one octave. By lowering or raising the music one octave, he can strike the keys and immediately gets an impression which establishes an understanding of pitch. He also can play the keys over several times and he will immediately understand the sound correspondence to the various positions on the great staff. Of course with the major scale no notes are flatted or sharped. It is seen then that the musical slide rule enables the student to visualize simultaneously note position on the great staff, fingered keys on the piano and, if he strikes the note on the piano, he then correlates the musical note that he hears directly with the note position on the great staff. Such as ability is greatly needed.

One of the great advantages of the present invention as an educational tool is the ability to constantly reinforce that knowledge which the student has acquired. That is to say, the student can take his slide and place it over the rule and put it into its various positions and he readily sees that which he learned. He can then play the notes to reestablish and reinforce his information with respect to the sound of the given note, his understanding of the fingered keys and the corresponding note position on the great staff. Therefore, that which is learned in the classroom can be extended to home study, thereby providing for much more efficient learning of music. Furthermore, it is envisioned that the student will retain these slides and rule long after he has first learned the music in order to be able to refresh his memory and reinforce his learning. This aspect will be better understood as we progress to more complicated slides which are programmed to teach different lessons.

Referring now to FIG. 4, we see the I, IV and V chords in major keys. The first chord is designated 41, the second chord 42 and the third 43 and the corresponding great staff notations are 44, 45 and 46, respectively. If the slide is placed over the great staff Do, Mi and Sol are shown over the corresponding positions for the fingered keys that must be depressed on the piano to produce this particular chord. Then the IV chord is also shown and for this key would then be Fa, La, Do. The relative position of the chords are then fixed by the chord. And then we have V chord upscale shown and designated 43, which is Sol, Ti, Re. Re of course is in the next highest octave above middle C. The I, IV, V chords in a major key (in this case C-major) do not strike any flats or sharps and accordingly this slide demonstrates not only the position of the fingered notes on a piano and the corresponding note position on the great staff, but also illustrates for the student immediately that the major scale does not have a flatted or sharped note as would a minor scale in similar positions. (Note: The V chord in major or minor are identical nevertheless.) The student can translate the slide to each and every key in an entire octave and prove to himself immediately what transpires. And so too, one will recognize with this particular slide the I, IV, V chords when immediately adjacent to one another that the above illustrated principles do prevail.

The lesson with respect to this slide is one of but many. It illustrates, by way of example, one of the many possible slides that can be developed or programmed for the teaching of a specific element in music. Referring to FIG. 5, we see another slide which is designated minor seventh. This slide 50 has again inscriptions on the left and right of the slide designating the chord. It is Do, Ti or 1–7 and is illustrated as 51, and the corresponding note position on the great staff would be middle C and the seventh or B in FIG. 1, the third of central line on the upper half of the great staff. This slide illustrates one of the simpler lessons to be taught. However, in practice this interval is not easily taught without the aid of the present invention.

Referring to FIG. 6, we see another slide 51 and again designating a given chord. This time it is the dominant ninth chord. The root or middle C where we start in this particular key is designated 53 the individual notes 54, 55, 56 and 57 to align as the third, fifth, seventh and ninth. Turning now to great staff, we would find them with our right hand portion of the slide and designated 58 as corresponding to the 1st, 3rd, 5th 7th and 9th starting from middle C. If the root were shifted to a higher key, all of the positions on the scale or staff would move up accordingly into their appropriate places. Accordingly 53 is designated as the root for this and will be helpful in teaching other elements of the chord and their transpositions.

In FIG. 7, we see yet another slide 52 and this is designated now for the learning of deceptive resolution of the dominant seventh chord in major keys. Normally the dominant seventh chord will resolve to the 1 chord, which is a perfect fifth below. The deceptive resolution substitutes the sixth chord in place of the 1 chord as the resolution chord for the dominant seventh. The slide shows the resolution of each note in the entire chord, particularly the third and fifth being resolved into a double third of the sixth chord.

Numerous slides could be shown to illustrate many even more complicated procedures in music, especially such things as voice doubling, major and minor triads, harmonY, inversions of the triad, cadence, and a host of other elements of music learnings. It is envisioned that various slides will be developed to correspond to a given lesson. The student will then be equipped with a book containing the usual lessons which have a preplanned or programmed order of learning. However, the student will also be equipped with a scale and for each lesson a new slide will be developed. The student then can switch the slide all about, compare it with earlier slides — of course one could be offset by an octave — and compare that which he has learned earlier with the new lesson. Many lessons can then be programmed to fit a given slide which enables the student to visualize, if you will, musical notation on the great staff simultaneous with required fingered notes to play the chord in any key and thereby train his ear to recognize the chord or notes produced.

The present invention will be readily seen as a substantial advance in the learning and teaching of basic music theory. Moreover, it will be seen as an efficient way to reinforce and therefore solidly establish the fundamental principles of music essential for use in the classroom and other educational programs. Furthermore, Solfege or the teaching of basic music theory, in combination with instruction in various musical instruments, will be greatly enhanced and facilitated by the present invention.

Although I have described my invention with reference to particular apparatus, those skilled in the art may make many substitutions and variations without departing from the true scope and spirit of the present invention. I therefore wish to be limited only by the appended claims.

I claim:

1. A music slide rule for the teaching of music theory comprising,
   a rule having,
   the great staff inscribed along one edge,
   a piano keyboard inscribed along an opposing edge,
      said great staff and keyboard are aligned such that identical notes are positionally represented opposite one another,
   said inscribed great staff having preselective portions of preselected spaces shaded to indicate flatted or sharped notes for alignment with flatted or sharped keys on said keyboard,
   a transparent slide free to move up or down the scale to selected scale positions having,
   dual note designations for simultaneous registration on the great staff and keyboard,
   said note designations on said slide representing a chord, scale, interval, or a preprogrammed lesson in music theory.

* * * * *